UNITED STATES PATENT OFFICE

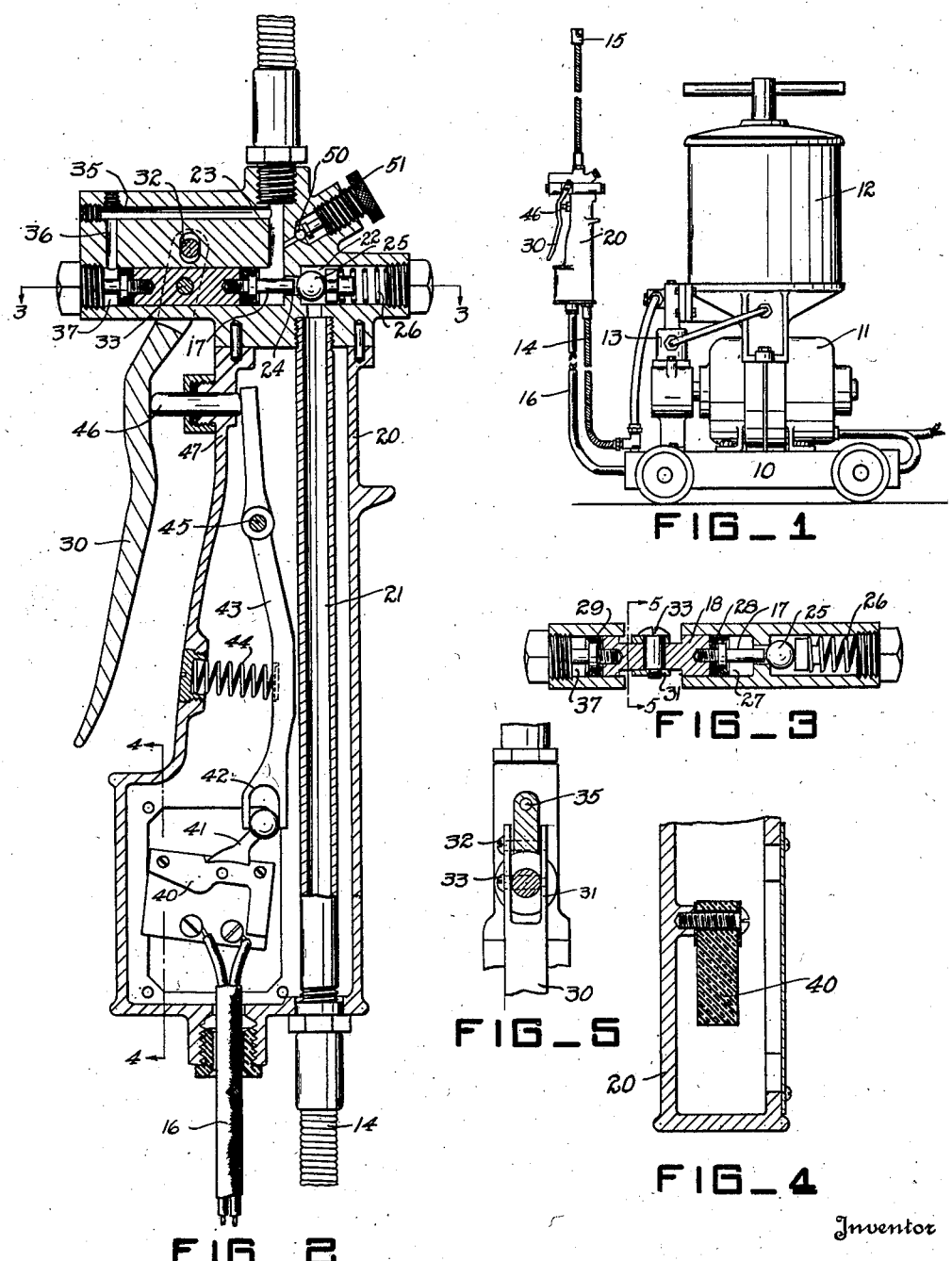

ROLLIN L. BACHER, OF LAKEWOOD, OHIO, ASSIGNOR TO THE UNITED STATES AIR COMPRESSOR COMPANY, OF CLEVELAND, OHIO, A CORPORATION OF OHIO

FLUID-DISPENSING APPARATUS

Application filed May 16, 1929. Serial No. 363,654.

This invention relates to power actuated grease pumps which are used for lubricating purposes, and particularly for greasing and lubricating motor vehicles. One device which has been used for this purpose and which has operated in a satisfactory manner comprises a portable unit, which carries a grease container, and an electric motor, with a pump which is actuated by the motor to force grease from the container through a flexible hose. For most efficient operation, a relatively long hose is usually employed and provision is made adjacent the free end of the hose for carrying an electric switch, which is connected in the motor circuit. This arrangement enables the operator to actuate the motor at the desired time and for the necessary period. In practice, it has been found however, that the motor turns a few revolutions after the circuit is opened, and as a result, a small amount of grease would leak from the hose at the end of each operation. Furthermore, it has been found that the pressure would increase in the hose only gradually when the motor circuit is closed. Thus, the grease would follow the path of least resistance, and in the case of spring shackles, it would flow out of only one end of the shackle bolt particularly if one side offered more resistance than the other.

An object of the present invention, therefore, is to minimize the leakage of lubricant material when the motor circuit is opened. A further object is to provide an apparatus, which is suitable for use in a portable unit and which when operated will cause a pressure to be left in the hose, after the circuit is opened. An advantage of this feature is that the built-up pressure will then be released into the bearing as soon as the motor circuit is closed, thus providing a "shot" lubrication of slight duration before the operating pressure is built up by the motor. This sudden release of pressure is sufficient in many cases to break down the resistance in certain bearings, particularly in shackle bolts, thus obviating the necessity for the use of hand tools to move the bolts, and also effecting a material saving in labor and time.

Referring now to the drawings, Fig. 1 is a side elevation of a portable lubricating unit embodying my invention; Fig. 2 is a longitudinal section on an enlarged scale through that part of the apparatus embodying my invention; Figs. 3 and 4 are sections taken on the correspondingly numbered lines in Fig. 2, and Fig. 5 is a section taken on the line 5—5 in Fig. 3.

The power grease pump with which my invention may be suitably used is shown in Fig. 1 as comprising a portable base 10, which carries an electric motor. A grease container 11 surmounts the motor and is suitably connected to a grease pump indicated in general at 13, which is actuated by the motor. A flexible discharge conduit 14 leads from the pump to a coupling 15, which is intended to be attached to a coacting pin fitting, usually mounted in the bearing to be lubricated. The hose 14 is usually a relatively long member, so as to permit lubrication of various parts of a motor vehicle, without necessitating movement of the unit to an objectionable degree. The motor need be actuated only when the flow of lubricant is desired and such operation may be controlled by a switch which is mounted on the hose near the free end thereof. To this end, a cable 16 extends from the carriage along side the hose. Such controller will hereinafter be explained more in detail, as it preferably is built into a casing 20, which houses my invention.

In general, my invention comprises a valve, which is mounted within the housing near the coupling, and includes mechanism for simultaneously actuating the valve to open position, when the motor circuit is closed, and for automatically closing the valve when the motor circuit is opened. The mechanism is mounted within a casing, which is shaped to be conveniently held in one hand of the operator, while the other hand is being used for adjusting the coupling to the fitting. Thus the operator may readily determine the time at which to start the motor, and also the length of time during which it should be operated.

Referring now more in detail to the apparatus, the casing 20 is shown as having a passageway 21 which forms a continuation of the hose 14. Such passageway communicates with a chamber 22, which in turn communicates with a chamber 23 through a port 24. The chamber 23 is then connected by a relatively small length of hose, to the coupling 15. Thus, a continuous passageway is provided through the casing for lubricant. Interposed in the passageway is a valve 25 which is normally held by a spring 26 in closed position while the motor circuit is open. The valve may be opened by movement of a pin 25, which is carried at one end of a plunger 26. The plunger operates in a guideway 27 which leads from the chamber 23. A suitable cap washer 28 at the pin end of the plunger prevents leakage of the material past the plunger.

To actuate the plunger in a valve opening direction, I provide a trigger 30 which extends along one side of the casing and which is adapted to be operated in a valve opening direction by finger pressure and to be automatically moved in the opposite direction upon release of such pressure. The trigger takes the form of a lever, one end of which is forked as at 31, and is pivotally mounted at 32 to the casing. The forked portion is intermediately connected at 43 to the plunger. To balance the lubricant pressure acting on one end of the plunger, I have shown a passageway 35, which is connected with the chamber 23, and which extends around through passageway 36 to chamber 37. Thus lubricant under pressure is in contact with both ends of the plunger, and hence the valve may be held opened with only a small effort by the operator.

The circuit controller for the motor is indicated in general at 40 within the casing and at the end opposite the valve. The controller may take the form of a snap switch having an operating lever 41, the free end of which extends within a recess 42 of an actuating lever 43. A spring 44 acts against the lever to hold it in the position indicated in the full lines in Fig. 2, in which position the motor circuit is open, and the lubricant valve is closed. The lever may be pivoted, as at 45, to the casing and may be connected to the trigger by a pin 46 which is slidably mounted in the wall 47 of the casing. It is obvious that the spring 44 acting upon the lever 43, on the pin 46, and on the trigger functions to hold the plunger pin out of contact with the ball, thus enabling the spring 26 to hold the ball in the closed position. It is also obvious that when the pressure is exerted upon the trigger to open the valve, the snap switch lever 41 is moved to close the motor circuit.

If for any reason, it is desired to release the pressure in the hose, provision is made for accomplishing this result by means of a valve 50 which communicates with chamber 23, and which is controlled by a thumb screw 51.

From the foregoing description, it will be evident that my invention minimizes leakage at the coupling when the motor circuit is opened, as there is only a relatively short length of hose between the valve casing and the coupling. It is also obvious that a pressure will be built up in that part of the hose between the valve and the pump, as the motor usually turns a few revolutions after the circuit is open, and that such pressure is then available for instant use, as soon as the valve is released during the next operation. This feature is valuable as it produces a sudden "shot" of lubricant into the bearing, and thereby breaks down the resistance more effectively.

I claim:

1. In combination, a lubricant compressor, an electric motor for operating the same, a flexible discharge conduit leading from the compressor, a casing in the form of a hand grip connected in the conduit, said casing having a trigger associated therewith, an arm pivotally mounted within the casing, means operatively connecting the trigger and arm, a controller within the casing for the motor, said controller being adapted to be closed when the trigger is moved in one direction, a valve within the casing and in said conduit, and means associated with the trigger to open the valve when the controller is closed.

2. In combination, a lubricant compressor, a conduit leading therefrom, a housing connected within the conduit and forming a continuation thereof, said housing having an enlarged chamber in one end thereof, a circuit controller within said chamber for said motor, an arm pivotally mounted within the housing and acting upon the controller, the trigger positioned outside the housing and operatively connected to the arm.

3. In combination, a lubricant compressor, an electric motor for operating the same, a flexible discharge conduit leading from the compressor, a casing in the form of a hand grip connected in the conduit, said casing having an offset passageway extending therethrough, and providing a continuation of the conduit, a valve in said passageway, a counterbalanced plunger adapted to engage the valve and to unseat the same whereby lubricant may flow uninterruptedly through the passageway and conduit, a trigger member positioned outside the casing and pivotally connected to the plunger, a circuit controller within the casing for the motor, an arm pivotally mounted within the casing and at one end operatively engaging the controller, and means extending through the casing and operatively connecting the other end of the arm to the trigger.

4. In combination, a lubricant compressor, an electric motor for operating the same, a flexible discharge conduit leading from the compressor and a casing interposed in the conduit and having a passageway extending therethrough, the passageway being in communication at each end thereof with the conduit, a valve within said passageway, a circuit controller for the motor within the casing, means operatively engaging the valve and controller for effecting simultaneous operation thereof, and other means associated with the passageway, and disposed on the discharge side of the valve for releasing the pressure in the conduit independently of the operation of said valve.

In testimony whereof, I hereunto affix my signature.

ROLLIN L. BACHER.